United States Patent [19]

Czachor et al.

[11] Patent Number: 5,273,397
[45] Date of Patent: Dec. 28, 1993

[54] TURBINE CASING AND RADIATION SHIELD

[75] Inventors: Robert P. Czachor; Scott P. Ryczek, both of Cincinnati, Ohio

[73] Assignee: General Electric Company, Cincinnati, Ohio

[21] Appl. No.: 3,895

[22] Filed: Jan. 13, 1993

[51] Int. Cl.[5] .................................. F01D 25/08
[52] U.S. Cl. ............................ 415/177; 415/178; 415/134; 415/136; 415/116
[58] Field of Search ............... 415/115, 116, 134, 135, 415/175, 176, 177, 178

[56] References Cited

U.S. PATENT DOCUMENTS

| | | |
|---|---|---|
| 2,837,270 | 6/1988 | Chapman . |
| 3,300,178 | 1/1967 | Rizk et al. ............... 415/115 |
| 3,825,365 | 7/1974 | Peng ........................ 415/116 |
| 3,893,786 | 7/1975 | Rahnke et al. ........... 415/178 |
| 4,053,254 | 10/1977 | Chaplin et al. . |
| 4,187,054 | 2/1980 | Landis, Jr. et al. . |
| 4,222,707 | 9/1980 | Drouet et al. ........... 415/116 |
| 4,379,677 | 4/1983 | Hallinger et al. . |
| 4,573,866 | 3/1986 | Sandy, Jr. et al. ....... 415/116 |
| 4,920,742 | 5/1990 | Nash et al. .............. 415/134 |
| 5,160,241 | 11/1992 | Glynn . |

Primary Examiner—Edward K. Look
Assistant Examiner—James A. Larson
Attorney, Agent, or Firm—Jerome C. Squillaro

[57] ABSTRACT

A thermal radiation shield is joined to an annular casing through which combustion gases are axially flowable. The shield is spaced at least in part radially inwardly from the casing inner surface and includes axially spaced apart forward and aft edges and radially outer and inner surfaces extending axially therebetween. The shield includes a trough disposed in the outer surface which faces the casing inner surface, and the trough extends along the shield at least in part both axially and circumferentially. A flow conduit extends through the casing and in flow communication with the trough for channeling cooling air thereto. The shield protects the casing from thermal radiation, and the trough is effective for channeling the cooling air both circumferentially and axially for reducing thermal gradients.

9 Claims, 4 Drawing Sheets

TURBINE CASING AND RADIATION SHIELD

The present invention relates generally to gas turbine engines, and, more protecting a turbine casing from thermal radiation.

BACKGROUND OF THE INVENTION

A gas turbine engine such as that used for powering an aircraft in flight includes a compressor for pressurizing ambient air which is mixed with fuel in a combustor and ignited for generating combustion gases which flow downstream through one or more turbines which extract energy therefrom. The hot combustion gases are channeled from the combustor through various flow confining structures including conventional turbine nozzles, turbine frames, and turbine rotor blade stages. All of these components are typically cooled from the adverse affects of the hot combustion gases by preferentially channeling cooling air bled from the compressor which returns to the combustion flowpath once it has performed its cooling function.

For example, a turbine frame is typically provided downstream of the combustor and includes a radially outer casing and a radially inner hub with a plurality of circumferentially spaced apart struts extending radially therebetween. The hub supports a conventional rotor shaft, with the reaction forces therefrom being channeled radially outwardly through the struts and into the casing. Since the struts extend through the combustion gas flowpath, they are typically surrounded by vanes or fairings which protect the struts from the combustion gases. The fairings are joined at their radially outer ends to an annular outer band or liner, and joined at their radially inner ends to an annular inner band or liner.

The outer band, for example, is typically spaced radially inwardly from the casing to define a generally open annular plenum which is suitably provided with bleed air from the compressor for cooling both the casing and the outer band in this vicinity. The cooling air channeled through the plenum absorbs heat at a generally uniform heat transfer rate along the various surfaces defining the plenum. However, the temperatures of the components defining the plenum vary considerably, with the hotter components enjoying less cooling than the cooler components which, therefore, creates undesirable thermal gradients through the various components with attendant thermally induced stresses.

Furthermore, the hotter components will radiate heat to adjacent components which requires even more cooling thereof. In order to reduce the heating effect from the hotter components, conventional sheet metal heat, or thermal radiation, shields are typically provided where necessary between a hot component and a cold component to interrupt the radiation of heat therebetween for reducing component temperatures and thermal gradients therein.

However, although a radiation shield can effectively block thermal radiation heating of cold components in the engine, thermal gradients typically remain especially in the axial direction which is the direction of combustion gas flow. For example, in the turbine frame described above, the fairings and inner and outer bands begin upstream of the struts and extend downstream therefrom for a considerable axial length. And, cooling air is typically channeled into the plenum between the outer band and the casing near its center and then fills the plenum. Since cooling is more effective where the cooling air is introduced into the plenum than at the axially forward and aft ends of the plenum, the turbine casing runs hotter at its forward and aft ends as compared to its mid-portion which creates axial thermal temperature gradients and corresponding thermal stresses therein. And, cooling air picks up heat between where it is introduced into the plenum and its eventual exit into the flowpath. This creates circumferential thermal gradients, out-of-round distortion of the case, increased turbine clearances, and performance loss.

SUMMARY OF THE INVENTION

A thermal radiation shield is joined to an annular casing through which combustion gases are axially flowable. The shield is spaced at least in part radially inwardly from the casing inner surface and includes axially spaced apart forward and aft edges and radially outer and inner surfaces extending axially therebetween. The shield includes a trough disposed in the outer surface which faces the casing inner surface, and the trough extends along the shield at least in part both axially and circumferentially. A flow conduit extends through the casing and in flow communication with the trough for channeling cooling air thereto. The shield protects the casing from thermal radiation, and the trough is effective for channeling the cooling air both circumferentially and axially for reducing thermal gradients.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
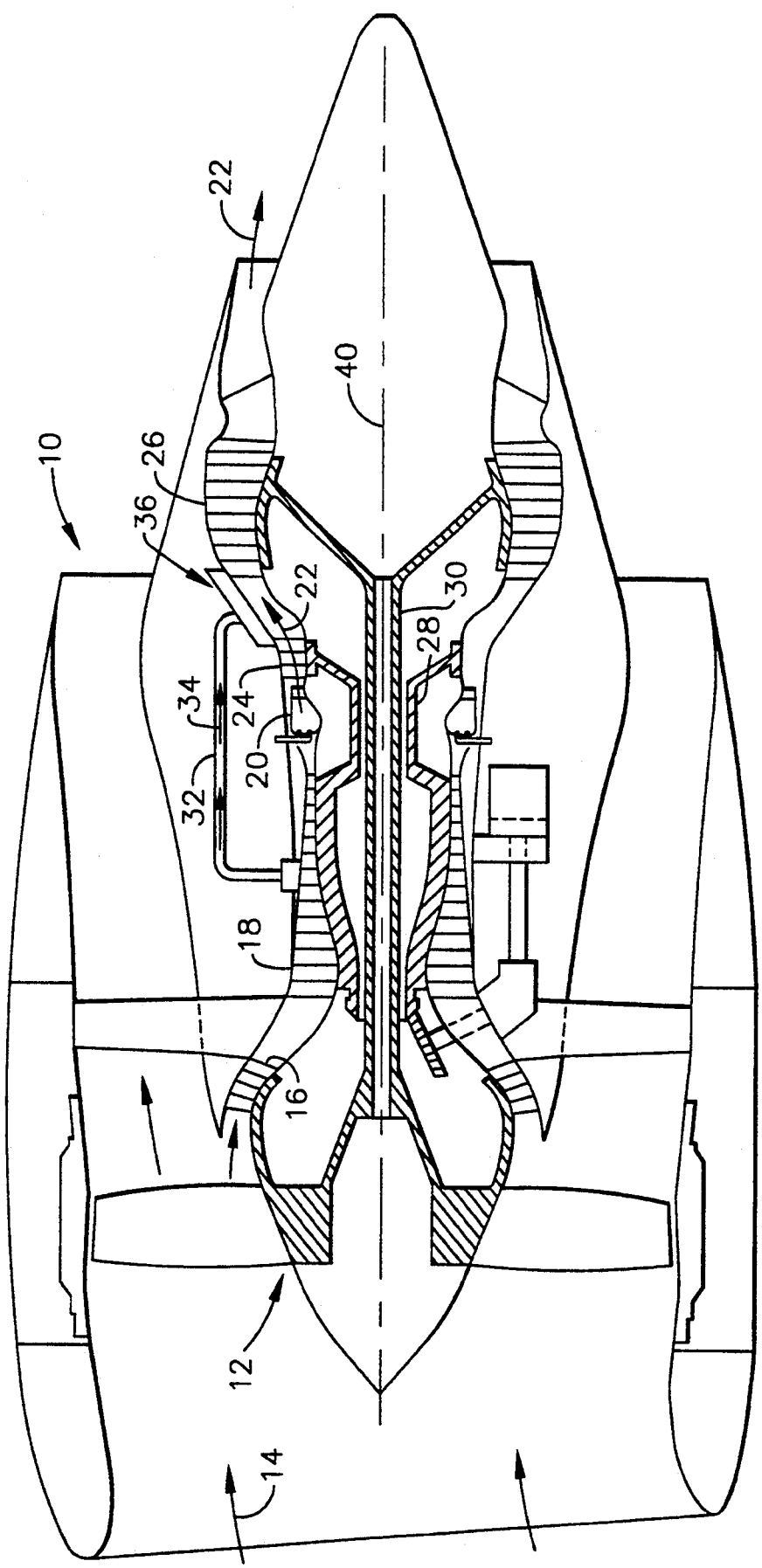
FIG. 1 is a longitudinal, sectional schematic representation of an exemplary turbofan gas turbine engine including a turbine frame in accordance with one embodiment of the present invention.

Illustrated schematically in FIG. 1 is an exemplary turbofan gas turbine engine 10 having conventional components including a fan 12 which receives ambient air 14, a low pressure, or booster compressor 16, a high pressure compressor (HPC) 18, a combustor 20 which conventionally mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first, or high pressure shaft 28 joins the HPT 24 to the HPC 18, and a second, or low pressure shaft 30 joins the LPT 26 to both the fan 12 and the low pressure compressor 16. A conventional bleed duct 32 is provided in flow communication with the HPC 18 for bleeding a portion of the compressed air therein for cooling hot components of the engine, with the bleed air being also referred to as cooling air designated 34.

Figure 2:
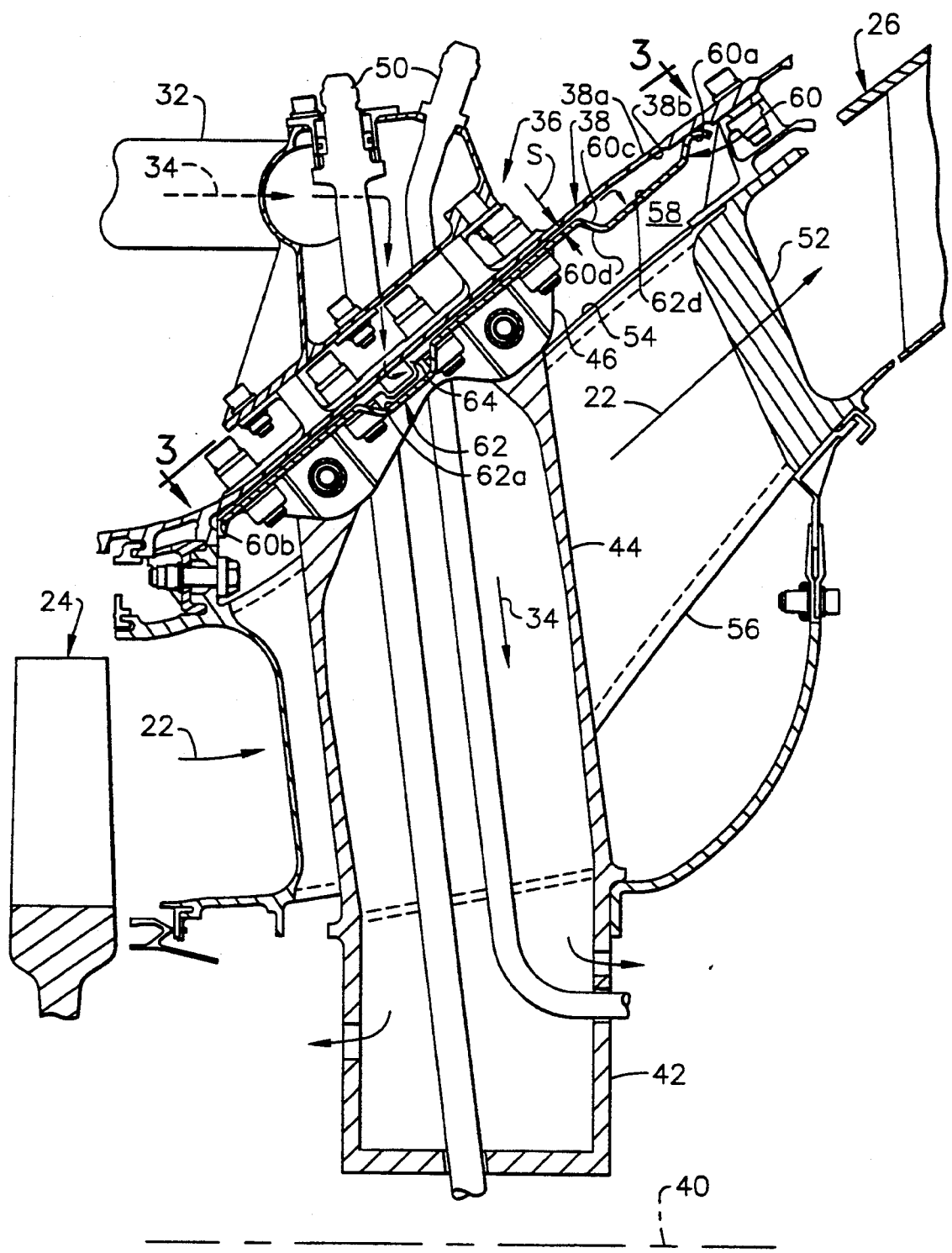
FIG. 2 is an enlarged, partly sectional view of a radially outer portion of the turbine frame illustrated in FIG. 1.

FIG. 2 illustrates in more particularly the region of the engine 10 between the HPT 24 and the LPT 26 where they join an annular turbine center frame 36. The turbine frame 36 includes an annular outer casing 38 having a longitudinal or axial centerline axis 40, which is also the centerline axis of the engine 10. The frame 36 also includes an annular hub 42 spaced radially inwardly from the casing 38, and a plurality of circumferentially spaced apart conventional struts 44 extending radially between the casing 38 and the hub 42 and fixedly joined thereto, respectively.

Figure 3:
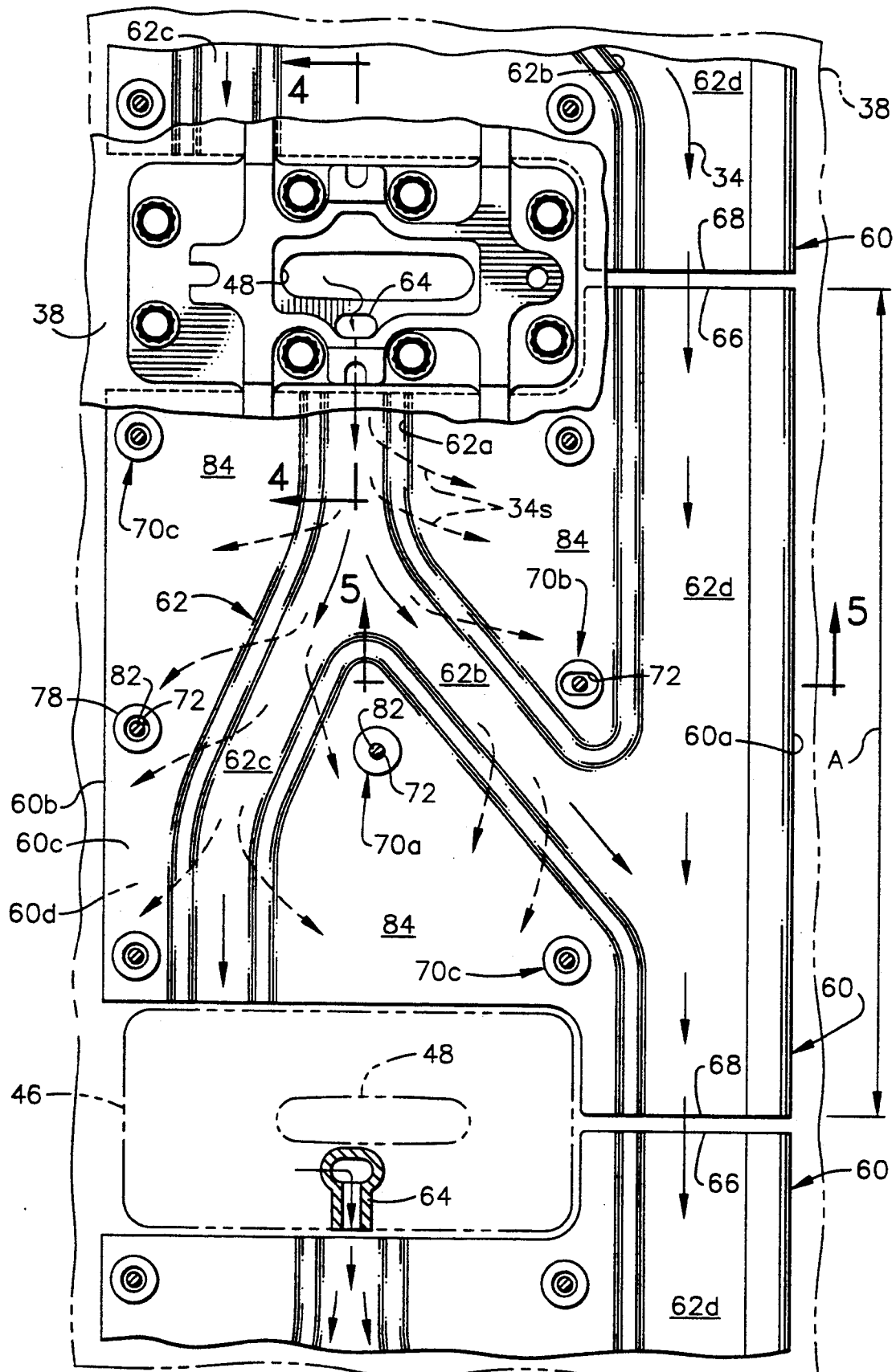
FIG. 3 is a top view of a portion of the turbine frame illustrated in FIG. 2 taken along line 3—3 and illustrates circumferentially adjoining radiation shields in accordance with one embodiment of the present invention.

For example, the radially outer end of each strut 44 is suitably bolted to a support pad 46 which in turn is suitably bolted to the casing 38 and in flow communication with a respective port 48 therein as shown in FIG. 3. Each of the struts 44 is preferably hollow and disposed in flow communication with the port 48, which in turn is conventionally disposed in flow communication with the bleed duct 32 for receiving the cooling air 34 therefrom. In this way, the cooling air 34 is channeled through the port 48 and radially downwardly through the strut 44 and suitably exists the hub 42. The struts 44 may also include conventional service pipes 50 which carry and return lubrication oil to the center region of the engine 10 as is conventionally known.

The frame 36 also includes a plurality of conventional vanes or fairings 52, each fairing 52 surrounding a respective one of the struts 44 and joined at a radially outer end thereof to an annular, radially outer liner or band 54, and joined at an opposite, radially inner end thereof to an annular, radially inner liner or band 56. The outer and inner bands 54, 56 define therebetween a flowpath between which the combustion gases 22 are axially flowable from the HPT 24 to the LPT 26 (see FIG. 1), with the combustion gases 22 also flowing between adjacent ones of the fairings 52.

The casing 38 includes radially outer and inner surfaces 38a, 38b, respectively, and the outer band 54 is spaced radially inwardly from the casing 38 to define therebetween an annular plenum 58. The combustion gases 22 flow axially through the casing 38 between the outer and inner bands 54, 56 and therefore radiate and conduct heat both radially outwardly toward the casing 38 and radially inwardly toward the hub 42. In conventional practice, a portion of the cooling air 34 would be suitably channeled into the plenum 58 for providing cooling of the outer band 54 and the opposing casing 38. However, since the cooling air 34 is typically channeled into the plenum 58 locally at its center region, it typically provides more cooling near the center region than near the forward and aft ends of the plenum 58 located upstream and downstream of the struts 44, respectively, which effects an axial thermal gradient in both the outer band 54 and the casing 38, as well as effecting tangential distribution of cooling air and tangential thermal gradients, and out-of-round distortion.

In accordance with one embodiment of the present invention, a plurality of circumferentially adjoining, arcuate thermal radiation shields 60 as shown in FIGS. 2 and 3 are disposed coaxially around the centerline axis 40 and are joined to the casing 38 in a preferred embodiment as described in more detail hereinbelow. As shown in FIG. 3, each shield 60 is preferably arcuate in the circumferential direction and extends for a predetermined arc angle A which may be selected, for example, so that each shield 60 extends between two adjacent ones of the struts 44. As shown in FIG. 2, the shield 60 is preferably spaced at least in part at a radial spacing S radially inwardly from the casing inner surface 38b for providing an effective thermal radiation shield to protect the outer casing 38 from the heat load generated by the combustion gases 22 flowing between the outer and inner bands 54, 56.

Each shield 60 includes axially spaced apart aft and forward edges 60a, 60b extending circumferentially relative to the centerline axis 40, and radially outer and inner surfaces 60c, 60d extending axially between the aft and forward edges 60a, b. As shown more clearly in FIG. 3, each shield 60 includes an open, generally U-shaped channel or trough 62 disposed in the shield outer surface 60c which is open to and faces without obstruction the casing inner surface 38b as shown more clearly in FIG. 2. Referring again to FIG. 3, the trough 62 extends along the shield 60 at least in part both axially and circumferentially relative to the centerline axis 40 in two components of inclination. As shown in FIGS. 2 and 3, the shields 60 are spaced radially inwardly from the casing 38 in the plenum 58 and extend both forward and aft of the struts 44 and circumferentially around the centerline axis 40 to provide a thermal radiation shield to protect the casing 38 from heat radiation generated by the combustion gases 22 flowable axially between the outer and inner bands 54, 56. The outer band 54 is preferably spaced radially inwardly from the shields 60 so that cooling air may be channeled into the plenum 58 both radially above and radially below the shields 60 within the plenum 58. The shield troughs 62 are effective to channel or direct the cooling air 34 in the axial direction, in addition to the circumferential direction, to more effectively cool the casing 38 near its forward and aft axial portions and to distribute the air 34 in a circumferentially uniform manner.

More specifically, the cooling air 34 is normally channeled to the frame 36 as illustrated in FIG. 2 through the hollow centers of the struts 44 which is at an axial location between the upstream and downstream ends of the fairings 52 and of the outer and inner bands 54, 56. In a conventional design, the cooling air enters the plenum 58 near the centers of the struts 44 and is therefore more effective for cooling hot components in that region than at axially forward and axially aft regions within the plenum 58. By providing the troughs 62 in the shields 60 in accordance with the present invention, the shields 60 provide relatively deep channels for channeling the cooling air 34 both axially and circumferentially as better illustrated in FIG. 3 for more effectively utilizing the cooling air 34 to selectively cool hot components in addition to providing a radiation shield therefor.

Figure 4:
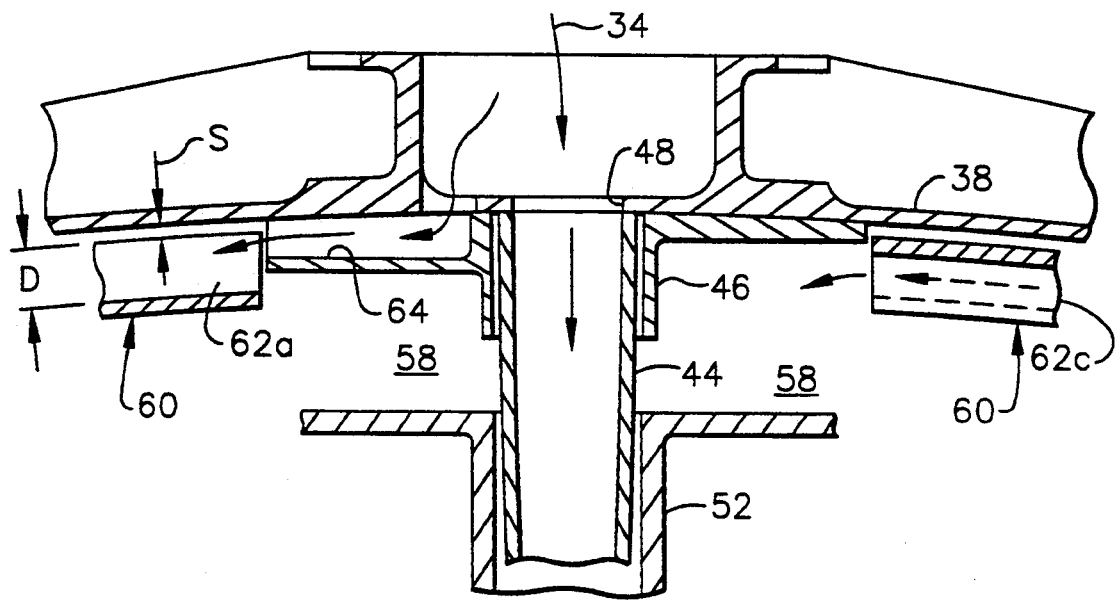
FIG. 4 is a radial sectional view of a portion of the turbine frame illustrated in FIG. 3 and taken along line 4—4 which shows the radially outer portion of a strut joined to the casing, with a flow conduit providing cooling air to a circumferentially adjacent one of the radiation shields.

As shown in FIG. 3, the trough 62 preferably has portions defining a Y-configuration including an inlet 62a extending solely circumferentially and spaced at an intermediate position from both the shield aft and forward edges 60a, 60b, for receiving the cooling air 34 and initially directing it circumferentially. In the preferred embodiment illustrated in FIGS. 2-4, means for tangentially providing the cooling air 34 into the trough inlet 62a includes a flow conduit 64 extending radially inwardly through the casing 38 and circumferentially through a portion of the support pad 46 adjacent to the port 48, as illustrated more clearly in FIG. 4, and in flow communication with the trough inlet 62a for channeling or injecting the cooling air 34 tangentially or circumferentially relative to the centerline axis 40 into the trough 62. The cooling air 34 is effective for cooling both the shield 60 itself and the casing inner surface 38b, as well as the outer band 54.

As shown in FIG. 3, the trough 62 has additional integral portions including first and second branches 62b and 62c, respectively, which branch off from the inlet 62a to define the Y-configuration. The first and second branches 62b, 62c are each skewed or inclined to extend both axially and circumferentially for channeling and splitting the cooling air 34 from the inlet 62a axially forwardly and rearwardly, respectively, for axially spreading the cooling air 34 between the shield 60 and the casing 38 to more effectively cool the casing 38. The first branch 62b extends from the trough inlet 62a in the circumferential direction and is inclined axially toward the shield aft edge 60a, and the second branch 62c diverges from the first branch 62b and extends circumferentially from the trough inlet 62a and axially toward the shield forward edge 60b. The first branch 62b is provided to channel a portion of the cooling air 34 axially downstream to more effectively cool the casing 38 disposed radially above the aft portion of the outer band 54. Similarly, the second branch 62c extends in the upstream direction for channeling another portion of the cooling air 34 in the axially forward direction for more effectively cooling the casing 38 disposed near the forward end of the outer band 54. In this way, the cooling air 34 channeled into the trough inlet 62a is spread axially as well as circumferentially for more effectively cooling the casing 38.

As shown in FIG. 3, the plurality of shields 60 circumferentially adjoin each other around the centerline axis 40, with each trough inlet 62a thereof independently receiving a portion of the cooling air 34 through a respective one of the flow conduits 64 disposed in flow communication therewith for ensuring a more uniform circumferential supply of the cooling air 34 into the several shields 60. Since the fairings 52 and the outer and inner bands 54, 56 extend for a considerable distance downstream from the struts 44 as shown in FIG. 2 in this exemplary embodiment, the shields 60 also extend axially downstream from the struts 44 and generally coextensively with the outer band 54 for protecting the casing 38 from the high radiation heat load coming from the outer band 54 due to the combustion gases 22 being confined thereby. Since this region of the casing 38 is exposed to such high heat load, more effective cooling thereof is required to reduce its operating temperature and reduce axial thermal temperature gradients in the casing 38 extending upstream therefrom to the point of introduction of the cooling air 34 through the ports 48 and the flow conduits 64.

In a preferred embodiment, each of the troughs 62 further includes another portion in the form of an integral cross branch 62d extending solely circumferentially in the shield outer surface 60c along the shield aft edge 60a and having first and second circumferentially spaced apart opposite ends 66, 68 as shown in FIG. 3. The cross branch first end 66 of a first one of the shields 60, i.e. the middle shield 60 illustrated in FIG. 3, is preferably disposed adjacent to the cross branch second end 68 of an adjacent second one of the shields 60, i.e. the top shield 60 illustrated in FIG. 3, for receiving the cooling air 34 channeled therefrom. And, the cross branch second end 68 of the first shield 60 is disposed integrally and in flow communication with the trough first branch 62b of the first shield 60 for receiving the cooling air 34 therefrom. The cross branch second end 68 of the first shield 60 is also disposed adjacent to the cross branch first end 66 of an adjacent third one of the shields 60, i.e. the bottom shield illustrated in FIG. 3, for channeling therein the cooling air 34 channeled firstly through the cross branch 62d of the first shield 60 from both the cross branch first end 66 and the first branch 62b thereof.

In this way, the several adjoining cross branches 62d collectively form a substantially continuous deep channel disposed axially downstream of the struts 44 and upstream of the aft end of the outer band 54 as illustrated in FIG. 2 and face radially outwardly without obstruction toward the casing inner surface 38b for more effectively cooling the casing 38 in this vicinity with the cooling air 34 channeled into the cross branches 62d. Accordingly, the cooling air 34 is first provided to each of the shields 60 through the inlet 62a and is then channeled axially through the first branch 62b to feed the respective cross branch 62d integrally joined thereto. Since the cross branch 62d preferably extends circumferentially along the shield aft edge 60a it preferably adjoins the next adjacent cross branch 62d for continuing to carry the cooling air 34 circumferentially around the centerline axis 40.

As shown more clearly in FIG. 2, each of the shields 60 is preferably a sheet metal component, and the branch 62 may be conventionally stamped therein so that the trough 62 defines a relatively deep recess or channel in the shield outer surface 60c and a complementary plateau on the shield inner surface 60d which is effective for stiffening the shield 60. The generally U-shaped configuration of the trough 62 increases the moment of inertia which therefore stiffens the shield 60 against bending in the radial direction. The sheet metal shield 60 effectively blocks radiation heating of the casing 38, and since it is relatively thin, it, itself, is more effectively cooled by the cooling air 34 channeled through the trough 62, with the cooling air 34 also effectively cooling the casing 38 spaced radially outwardly therefrom.

In the exemplary embodiment illustrated in FIG. 2, the cross branches 62d are spaced axially aft from the struts 44 and extend radially above the outer band 54 in the plenum 58 for more effectively cooling the casing 38 subject to the relatively high heat load in this vicinity. The shields 60 are preferably joined to the casing 38 with the shield aft edges 60a disposed in clamping contact with the casing inner surface 38b to reduce axial leakage of the cooling air 34 from the cross branches 62d, and to restrain vibration. As shown in FIG. 2, the shield aft edge 60a is arcuate in the axial direction for allowing sliding contact with the casing inner surface 38b and differential thermal expansion therebetween while still reducing leakage therebetween. Since the shield aft edge 60a is allowed to slide during operation, it may be covered with a suitable wear surface for reducing wear thereof, such wear surface being preferably provided by wear strips formed integrally therewith or brazed thereon. The wear strips may be formed of a conventional wear material such as that identified by the AMS 5759 designation.

Since the shields 60 are disposed between the relatively hot outer band 54 and the relatively cool casing 38, they are subject to differential thermal expansion and contraction relative thereto and must be suitably fixedly joined in the frame 36 for allowing substantially unrestricted differential thermal expansion and contraction for reducing thermal stresses therein. More specifically, and referring to FIG. 3, each of the shields 60 is preferably joined to the casing 38 adjacent its inner surface 38b (see also FIG. 2) at a plurality of circumferentially and axially spaced apart joints including a single first joint 70a configured to restrain radial, axial, and circumferential movement of the shield 60 thereat. A single second joint 70b is configured to restrain both radial and circumferential movement of the shield 60 thereat while allowing a predetermined amount of axial movement of the entire shield 60 thereat relative to the first joint 70a. And, a plurality of auxiliary joints 70c, five being shown for example for each shield 60, are configured to restrain solely radial movement of the shield 60 thereat while allowing predetermined axial and circumferential movement of the entire shield 60 relative to the first joint 70a.

Figure 5:
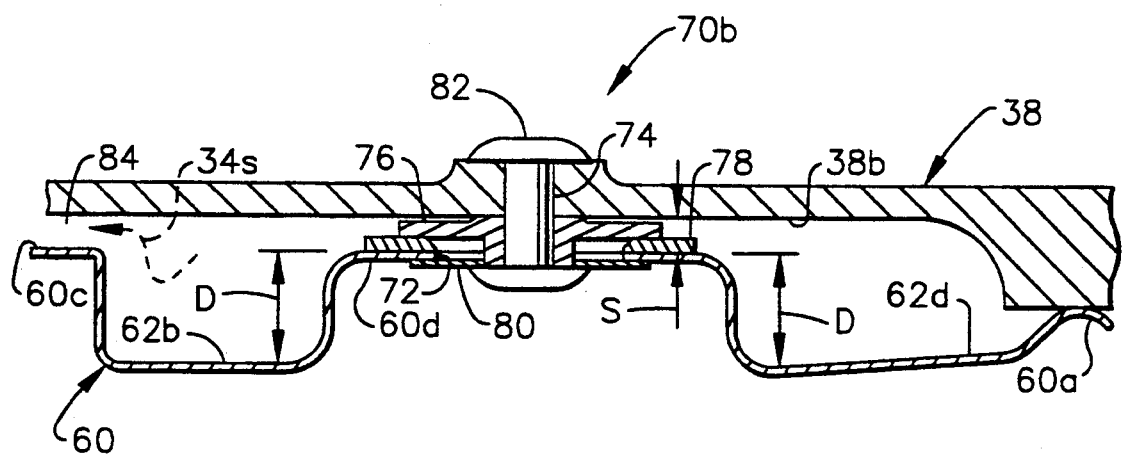
FIG. 5 is a transverse sectional view through one of the radiation shields illustrated in FIG. 3 and taken along line 5—5.

FIG. 5 illustrates in more particularity a sectional view through the second joint 70b, the casing 38 and the shield 60, with all the joints 70a–c being substantially identical except for preferred clearances contained therein. More specifically, each of the first, second, and auxiliary joints 70a–c includes an aperture 72 through the shield 60, and an axially aligned aperture 74 through the casing 38. An annular, preferably tubular, bushing or spacer 76 in the exemplary form of a washer is disposed between the shield 60 and the casing 38. A wear washer 78 is disposed radially between the spacer 76 and the shield 60, with the spacer 76 and the washer 78 being sized in the radial direction to space the shield 60 radially inwardly from the casing inner surface 38b at the predetermined radial spacing S. The wear washer 78 may be formed of any suitable wear resisting material such as that identified by the L605 designation described above, and may be suitably brazed to the shield 60 for being rigidly joined thereto.

The joints also include a conventional Belville spring washer 80 disposed against the shield inner surface 60d, and a conventional fastener 82 such as a rivet extends in return through the casing aperture 74, the spacer 76, the wear washer 78, the shield aperture 72, and the Belville washer 80 for clamping the shield 60 to the casing 38. In all of the joints 70a–c, radial movement of the shield 60 relative to the casing 38 is prevented or restrained by this configuration.

However, in order to allow substantially unrestricted thermal expansion and contraction of the shield 60 relative to the casing 38, suitable clearances are required. More specifically, and referring to FIG. 3, the joints 70a–c are shown in cutaway fashion to illustrate the respective fasteners 82 extending through the centers of the respective shield apertures 72 which are identical to the respective openings through the wear washers 78. The first joint 70a is configured so that the shield aperture 72 is circular and has a diameter substantially equal to the outer diameter of the fastener 82 extending therethrough in accordance with conventional manufacturing tolerances, to restrain or substantially prevent both axial and circumferential movement of the shield 60 relative to the casing 38 at the first joint 70a.

Accordingly, the shield 60 will expand and contract relative to the first joint 70a during thermal transients, and, therefore, the second joint 70b is preferably disposed axially from the first joint 70a, and aft therefrom as illustrated in FIG. 3 although it could be disposed forwardly therefrom if desired. The shield aperture 72 of the second joint 70b is preferably elongate in the axial direction with parallel, axially extending sides joined together at semi-circular opposite ends, with the width between the two parallel sides being substantially equal to the diameter of the fastener 82 extending therebetween subject to conventional manufacturing tolerances for restraining or preventing circumferential movement of the shield 60 at the second joint 70b while allowing predetermined axial movement relative to the fastener 82 by allowing the shield 60 to move axially forwardly and aft relative to the fastener 82 within the elongated shield aperture 72. In this way, the shield 60 is allowed to freely expand and contract in the axial direction relative to the first joint 70a without thermal distortion and thermal stress which would otherwise occur if the second joint 70b prevented such axial differential movement.

The remaining, auxiliary joints 70c are spread around each of the shields 60 as required for merely radially joining the shield 60 to the casing 38 while allowing both axial and circumferential radial movement relative thereto. Accordingly, the shield apertures 72 of the auxiliary joints 70c are preferably circular and have diameters predeterminedly greater than the diameters of the fasteners 82 extending therethrough so that the shield 60 may expand and contract in both the axial and circumferential directions relative to the fasteners 82 without obstruction by the fasteners 82 of these joints 70c. In this way, the auxiliary joints 70c allow the shield 60 to expand and contract relative to the first joint 70a without restraint in the axial and circumferential directions.

Accordingly, the shield aperture 72 and its respective wear washer 78 are configured and sized relative to the respective fasteners 82 extending therethrough for each of the first, second, and auxiliary joints 70a, 70b, 70c to provide substantially no axial and circumferential clearance for the first joint 70a; solely axial clearance with substantially no circumferential clearance for the second joint 70b; and both axial and circumferential clearances for the auxiliary joints 70c for allowing unrestrained differential thermal expansion and contraction of the shield 60 relative to the casing 38.

Referring again to FIG. 5, the spacer 76 and the wear washer 78 position the shield outer surface 60c at the spacing S radially inwardly from the casing inner surface 38b which therefore provides a secondary flow channel 84 therebetween. The shield troughs 62 have a relative deep depth D radially inwardly from the shield outer surface 60c at the adjacent joints 70a–c which forms with the casing inner surface 38b the secondary channels 84 which have a relatively small depth, i.e. the spacing S. In this way, most of the cooling air 34 as desired is channeled through the trough 62 as illustrated with solid arrows in FIG. 3 from the inlet 62a and through the respective branches 62b, 62c and into the cross branch 62d. A secondary portion of the cooling air 34, designated secondary flow 34s is shown in dashed line and flows from the trough 62 along the shield outer surface 60c through the several secondary channels 84 to provide a substantially continuous blanket of the cooling air 34 between the shield 60 and the casing inner surface 38b for ensuring effective cooling along the entire casing inner surface 38b. The troughs 62 allow the primary cooling air 34 to flow both axially aft through the first branch 62b and axially forward through the second branch 62c to provide increased cooling of the casing 38 near the respective aft and forward portions of the outer band 54 for accommodating the increased heat load therefrom. And, the secondary flow 34s provides cooling of the casing 38 as well as of the shield 60 between the several portions of the trough 62.

Accordingly, the improved radiation shields 60 in accordance with the present invention effectively shield the casing 38 from radiation heating from the combustion gases 22 flowing through the center frame 36 while providing the troughs 62 to preferentially direct the cooling air 34 to areas subject to relatively high heat loads which require more effective cooling. The flow conduit 64 is suitably sized to meter the cooling air 34 and inject it tangentially into the trough inlet 62a for initial flow in the circumferential direction. In the preferred embodiment illustrated, the trough inlet 62a is disposed near the axial middle of the shield 60 and the two branches 62b, 62c divide the cooling air 34 as desired to channel the cooling air 34 towards both the shield aft and forward edges 60a, 60b. In this way, the cooling air 34 may be preferentially diverted to areas requiring most cooling, while diverting away the cooling air 34 to areas requiring less cooling. The secondary channels 84 ensure that at least some of the cooling air 34 is channeled over the entire shield outer surface 62c for obtaining complete and more uniform cooling depending upon the specific heat load distribution. The casing 38 is, therefore, more effectively cooled and may operate at reduced temperature with reduced axial thermal gradients therethrough as compared to a conventional design without the radiation shields 60.

Furthermore, the radiation shield 60 is a relatively lightweight sheet metal component which may be readily manufactured using conventional techniques and at relatively low cost. Although the shield 60 is relatively thin, the relatively deep troughs 62 increase its structural rigidity for reducing stresses therein during operation as well as reducing vibration thereof. By clamping the shield 60 to the casing 38 using the fastener 82 and the Belville washers 80, vibratory response of the shield 60 is further damped and reduced. The several joints 70a–c provide a relatively simple attachment of the shield 60 to the casing 38 which is thermally independent thereof, and also allows for relatively easy replacement thereof as required.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine apparatus comprising:
    an annular casing having an axial centerline axis and radially outer and inner surfaces for channeling axially therethrough combustion gases;
    a thermal radiation shield joined to said casing and spaced at least in part radially inwardly from said casing inner surface and including:
        axially spaced apart aft and forward axial edges extending circumferentially relative to said centerline axis;
        radially outer and inner surfaces extending axially between said aft and forward edges; and
        a trough disposed in said shield outer surface and facing said casing inner surface, said trough extending along said shield at least in part both axially and circumferentially;
    a flow conduit extending through said casing and in flow communication with said trough for channeling cooling air therein and
    said trough having portions defining a generally Y-configuration including a circumferentially extending inlet spaced at an intermediate position between said shield aft and forward edges for receiving said cooling air from said conduit and for channeling said cooling air into first and second branches extending both axially and circumferentially for axially spreading said cooling air.

2. An apparatus according to claim 1 further including a plurality of circumferentially adjoining ones of said shields disposed coaxially said centerline axis, with a plurality of said flow conduits disposed in flow communication with respective ones of said trough inlets.

3. An apparatus according to claim 2 wherein each of said shield troughs further includes another portion in the form of a cross branch extending circumferentially in said shield outer surface and having first and second circumferentially opposite ends, said cross branch first end of a first one of said shields being disposed adjacent to said cross branch second end of an adjacent second one of said shields for receiving said cooling air channeled therefrom, and said cross branch second end of said first shield being disposed integrally in flow communication with said first branch of said first shield for receiving said cooling air therefrom, and disposed also adjacent to said cross branch first end of an adjacent third one of said shields for channeling therein said cooling air channeled through said cross branch of said first shield from both said cross branch first end and said first branch thereof.

4. An apparatus according to claim 3 wherein in each of said shields said first branch extends from said trough inlet toward said shield aft edge, and said second branch extends from said trough inlet toward said shield forward edge, and said cross branch extends circumferentially along said shield aft edge.

5. An apparatus according to claim 4 wherein each of said shields is sheet metal, and said trough in said shield outer surface defines a complementary plateau on said shield inner surface for stiffening said shield.

6. An apparatus according to claim 5 further comprising:
    an annular turbine frame hub spaced radially inwardly from said casing;
    a plurality of circumferentially spaced apart struts extending radially between said casing and said hub and fixedly joined thereto; and
    a plurality of fairings, each surrounding a respective one of said struts and joined at one end to an annular radially outer band and joined at an opposite end to an annular radially inner band between which outer and inner bands said combustion gases are axially flowable, said outer band being spaced radially inwardly from said shields; and said shield cross branches being spaced axially aft from said struts and extending radially above said outer band.

7. An apparatus according to claim 6 wherein said shields are joined to said casing with said shield aft edges disposed in clamping contact with said casing inner surface to reduce axial leakage of said cooling air from said cross branches thereof.

8. An apparatus according to claim 2 wherein each of said shields is joined to said casing at a plurality of circumferentially and axially spaced apart joints including:
 a first joint configured to restrain radial, axial, and circumferential movement of said shield thereat;
 a second joint configured to restrain both radial and circumferential movement of said shield thereat while allowing a predetermined amount of axial movement relative to said first joint; and
 a plurality of auxiliary joints configured to restrain solely radial movement of said shield thereat while allowing predetermined axial and circumferential movement relative to said first joint.

9. An apparatus according to claim 8 wherein each of said first, second, and auxiliary joints comprises:
 an aperture through said shield;
 an aperture through said casing;
 an annular spacer disposed between said shield and said casing;
 a wear washer disposed radially between said spacer and said shield, said spacer and said wear washer being sized to space said shield radially inwardly from said casing inner surface at a predetermined spacing;
 a Belville washer disposed against said shield inner surface; and
 a fastener extending in turn through said casing aperture, said spacer, said wear washer, said shield aperture, and said Belville washer for clamping said shield to said casing; and
wherein said shield aperture and said wear washer are sized relative to said fastener for each of said first, second, and auxiliary joints to provide substantially no clearance for said first joint, solely axial clearance for said second joint, and both axial and circumferential clearances for said auxiliary joints for allowing differential thermal expansion and contraction of said shield relative to said casing.

* * * * *